United States Patent
Loring et al.

[11] Patent Number: 6,020,887
[45] Date of Patent: *Feb. 1, 2000

[54] METHOD AND APPARATUS FOR SINGLE SCROLL BARS IN GRAPHICAL WINDOWS USER INTERFACE

[75] Inventors: Keith Loring, Coral Springs, Fla.; Alan Happ, Raleigh, N.C.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,846

[22] Filed: May 7, 1997

[51] Int. Cl.[7] ........................................................ G06F 3/00
[52] U.S. Cl. ........................... 345/340; 345/341; 345/973; 345/346
[58] Field of Search ..................................... 345/339, 340, 345/341, 342, 343, 123, 973

[56] References Cited

U.S. PATENT DOCUMENTS

| | | | |
|---|---|---|---|
| 5,165,012 | 11/1992 | Crandall et al. | 345/347 |
| 5,226,118 | 7/1993 | Baker et al. | 345/357 |
| 5,263,134 | 11/1993 | Paal et al. | 345/347 |
| 5,289,168 | 2/1994 | Freeman | 345/123 |
| 5,333,247 | 7/1994 | Gest et al. | 345/341 |
| 5,473,745 | 12/1995 | Berry et al. | 345/340 |
| 5,485,174 | 1/1996 | Henshaw et al. | 345/123 |
| 5,491,781 | 2/1996 | Gasperina | 345/341 |
| 5,528,259 | 6/1996 | Bates et al. | 345/973 |
| 5,548,703 | 8/1996 | Berry et al. | 345/356 |
| 5,553,225 | 9/1996 | Perry | 345/341 |
| 5,726,687 | 3/1998 | Belfiore et al. | 345/341 |

OTHER PUBLICATIONS

AN–96–375817/38: Information comparison appts. (Abstract).
AN–94–145985/18: Data Processing System (Abstract).
AN–95–053370/08: Two–dimensional Data Scrolling Method (Abstract).
AN–95–129360: Display Control Device (Abstract).
AN–92–155386: Picture Scroll Processing Method (Abstract).

*Primary Examiner*—Raymond J. Bayerl
*Assistant Examiner*—Cao H. Nguyen
*Attorney, Agent, or Firm*—Quarles & Brady LLP

[57] ABSTRACT

A scroll transfer control button is provided so that a single set of scroll controls can be used to alternately control scrolling in a plurality of separate windows which may be concurrently presented on a display device. Each time a scroll transfer control button is activated, active scroll control switches so that scroll control can be transferred from a work object contained in a first displayed window to another displayed window. Active scroll control can be returned to the first displayed window by toggling the scroll control button until the active scroll control returns. The single set of scroll controls is preferably provided at the edge of the edge of the available area for displaying windows containing work objects. The single set of scroll controls can be trivially thin in appearance or may be transparent due to their consistent presentation at an extreme edge of a display area.

15 Claims, 6 Drawing Sheets

METHOD AND APPARATUS FOR SINGLE SCROLL BARS IN GRAPHICAL WINDOWS USER INTERFACE

BACKGROUND OF THE INVENTION

1. Technical Field

This invention relates to the field of computer user interface systems and more particularly to a system for minimizing or eliminating the display area required for scroll bars in a graphical windows user interface environment.

2. Description of the Related Art

Graphical user interfaces for computers have become widely used and accepted in recent years, particularly those systems which permit a single display device to present information in two or more discrete areas on a single screen. These discrete areas, often referred to as "windows" can be used to present information to a user in the form of text, drawings, and the like. For convenience, the information presented in a particular window shall herein be referred to as a "work object", since it is generally displayed to a user so that a particular action can be performed with respect thereto, such as reading, entering data, or manipulating the content of such window. For the purpose of implementing a graphical user interface, it has become common to provide means by which a user can point to objects on screen by moving a displayed pointer cursor so that it is positioned over a particular graphical user interface element, and causing the computer system to respond in some manner associated with that particular user interface element. Movement of the cursor can be accomplished by means of physical manipulation of a pointer device, such as a mouse, joystick or a keyboard's direction control keys. Pointer control signals can be provided by, for example, clicking on a mouse signaling button, striking a key, and the like. Various methods and systems are available for implementing such graphical user interface systems as is well known to computer programmers in this field.

In the past, the number of interactive windows which could practically be displayed to a user on a display device was severely limited by considerations such as computer processing speed, available memory, and operating system architecture. In recent years, however, computers and their operating systems have become considerably more advanced, with the result that it is now possible to have a great many individual windows which may appear on the screen area. As a result, the available area for displaying windows on a screen will often be insufficient and must be carefully managed. In this regard, various systems have been implemented to permit windows to be stacked, one on top of the other, or to be moved and re-sized, so that a user has maximum flexibility in making best use of the available screen area. However, such display area management often creates problems of its own. For example, when a window's area is reduced, the information contained therein is generally not re-sized to fit the window, as this would create obvious difficulties for the user who needs to observe such information. Instead, scrolling systems are generally provided which permit the work object contained within a window to be moved with respect to its apparent position within the window. Thus, for example, if a window is sized such that only a bottom-left portion of the work object contained therein can be observed by a user, the scroll bar controls associated with such window can be manipulated so that the upper-right portion of the document appears within the window. Scroll controls are commonly provided adjacent to a vertical and horizontal boundary area defining the limits of available area of a window where a work object can be displayed. Scrolling controls typically are provided for permitting the apparent position of the work object to be moved vertically (along a y coordinate direction) or horizontally (along an x coordinate direction) within the window. In this regard, it is said that the "apparent" position of the work object is moved because the window in fact acts as a viewer of the electronically stored work object, and it is perhaps more accurate to say that it is the viewpoint of the window which is changed.

The scroll bars for each window are typically displayed within the display area of the window. Other systems have also been proposed wherein the scroll operation is implemented as a secondary display and control window on the face of the computer display. Examples of such scroll bar systems are disclosed in various references including U.S. Pat. No. 5,485,174 to Henshaw et al. Significantly, however, while such systems are adequate for the purpose of repositioning the viewpoint of a window, they present a further problem in that they occupy valuable viewing area which is more desirably used to represent one or more work objects to a user. Where multiple windows are presented on a computer display, each window containing a work object which exceeds the relative size of the window is provided with a set of scroll bars, thereby multiplying the amount of wasted screen area which can be better used for display of a work object. Further, such systems suffer from the fact that they require careful attention from a user when they are to be used. Scroll mechanisms of the prior art typically require very accurate positioning of a cursor over a discrete portion of the scroll bar to effect repositioning of the window viewpoint. For example, arrow "buttons" are sometimes integrated at relatively small end portions of a scroll bar to designate a portion of the bar which must be actuated in order to cause the window viewpoint to be altered, as in Henshaw et al. Positioning a cursor in the proper area and maintaining it there during the scrolling process can be a physically demanding task, particularly on small display screens, due to the tendency of slight pointer device movements to cause the cursor to shift off the arrow buttons.

Finally, in computer systems configured for certain types of uses, scroll bars may be almost entirely superfluous. For example, great progress has been made in computer speech recognition systems to the end that computers may now be controlled almost entirely by voice command. In such systems, scrolling commands may be implemented primarily by speech commands rather than pointer movement and control signals, e.g., mouse movement and clicking. Thus, while there may remain some need for a pointer actuated scroll control, such controls would rarely be used and it would be desirable to minimize or eliminate the portion of any screen display devoted to such functions. Ideally, this would leave more room for display of work objects and windows having greater relevance and usefulness to a user. It would also be desirable to reduce screen clutter in a way which results in a simplified screen display.

SUMMARY OF THE INVENTION

A scroll transfer control button is provided so that a single set of scroll controls can be used to alternately control scrolling in a plurality of separate windows which may be concurrently presented on a display device. Each time the scroll transfer control button is activated, active scroll control switches so that scroll control can be transferred from a work object contained in a first displayed window to another displayed window. Active scroll control can be returned to the first displayed window by toggling the scroll control button until the active scroll control returns. The single set of scroll controls is preferably provided at the edge of the total available display area. Significantly, because of the consistent location of such scroll controls at the extreme boundaries of the user interface display area, their dimensions may be reduced to trivially thin or even transparent elements. In such instances, the electronic cursor may appear to move beyond the edge of the screen display but a portion will in fact always remain positioned at the extreme edge of the screen, regardless of how far beyond such edge a user may attempt to cause the cursor to move, for example by further mouse movements. The cursor controls are superimposed, in an area which may be as narrow as one or two pixels wide, at an extreme edge of the screen display area. In the case of transparent cursor controls, the scroll bars and buttons are not displayed graphically and therefore do not use any of the valuable display screen "real estate." A horizontal (x coordinate direction) control is preferably located along a top or bottom edge of the screen display area and a vertical (y coordinate direction is preferably located along the right vertical side edge of the screen display area. Cursor controls of such extremely narrow dimensions or with no visible appearance, would be essentially useless if positioned anywhere except the display screen edge, because it would be quite difficult to superimpose a cursor over their location for the purpose of activation. With such "invisible" cursor controls, direction of movement along a particular x or y coordinate direction is determined by positioning the cursor on one side or the other of a center line defined with respect to the x and y coordinate directions.

The invention has several benefits over conventional scrolling systems. Most importantly, it provides more workspace on a display screen, with less visual clutter. Further, a user only needs to be concerned with a single set of scroll bars, rather than multiple sets, which reduces the cognitive load. Finally, the consistent location at the extreme edge of the operative display area permits users to be less precise in locating the scroll bars. In particular, since the scroll controls are always at the edge of the screen, a user will never experience difficulty in positioning a cursor on the scroll bars. This also permits their configuration to be changed to trivially thin or to transparent components.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
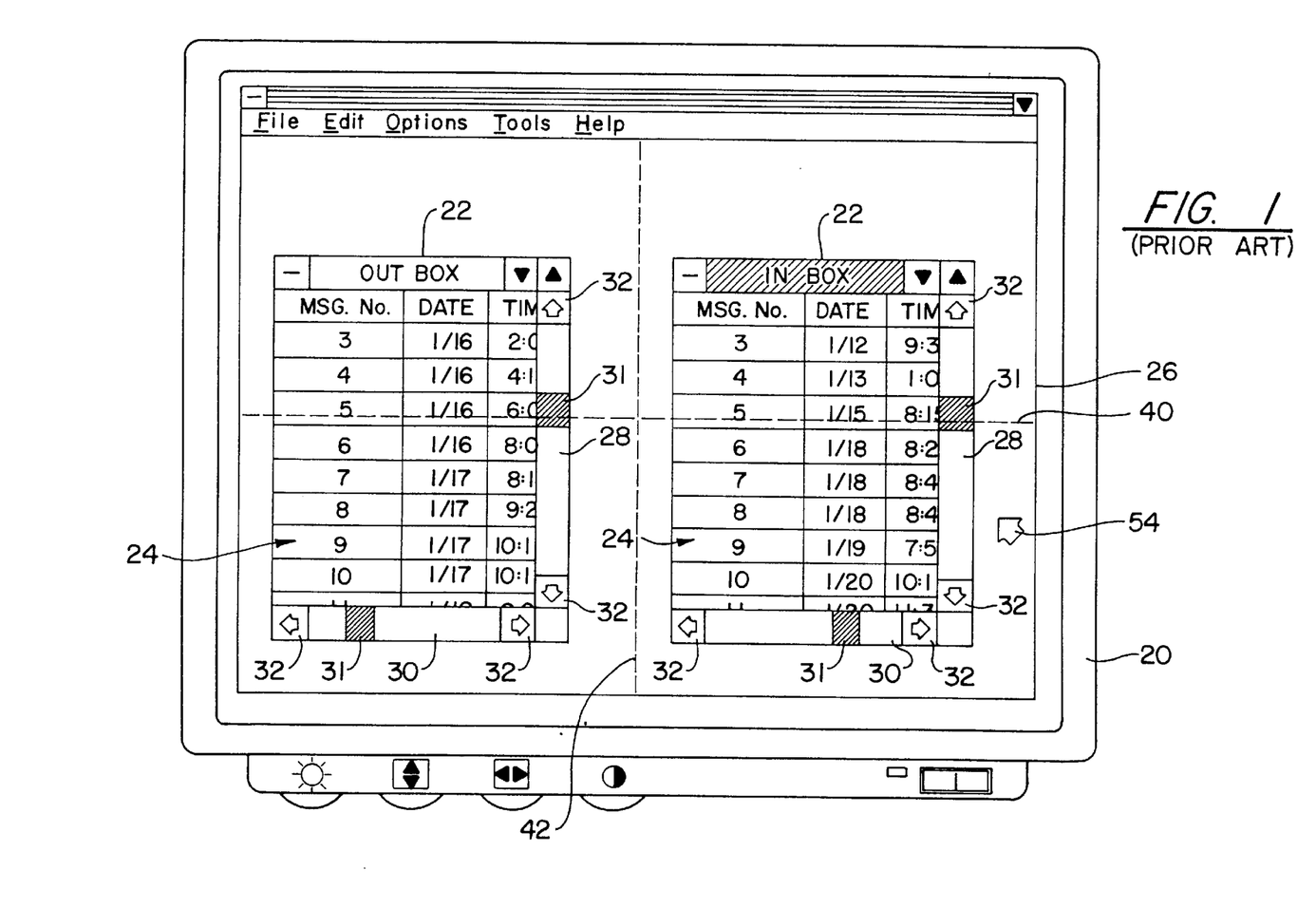
FIG. 1 is an example of a prior art computer display screen containing a plurality of open windows, each having a set of conventional scroll bars.

FIG. 1 illustrates a typical screen display of the prior art which is presented on a display unit 20. Windows 22 are illustrated in FIG. 1 within the boundaries of the operative display area 26 of the display unit, with each window containing a work object 24. In this case, the work objects 24 comprise an "In Box" and an "Out Box" for an electronic messaging system; however, the invention is not limited in this regard and can be used in any instance where multiple windows are displayed. The work objects 24 contained in each of the windows are dimensioned such that the total apparent size of each work object exceeds the area which is visible to the user within the windows 22 as currently sized. As a result, scroll bars 28 and 30 are provided to permit a user to alter the viewpoint of the window to observe a different portion of the work object 24. Typically, scroll bars are provided as shown, aligned with the right-most and bottommost interior edges of the work object display area. They extend substantially across the height and width of the window and contain a position indicator 31 to designate the relative position of the window viewpoint with respect to the work object. For example, the vertical position indicators in windows 22 are located in approximately the vertical center of the vertical scroll bars 28, thus indicating that the viewpoint of the windows is approximately in the center of each of the work objects 24. Control buttons 32 are provided whereby a user can change the viewpoint of the window, for example by clicking with a mouse, on the control button 32 having an arrow which points in the direction which the viewpoint is desired to be moved.

As can be seen in FIG. 1, the scroll bars 28, 30 require a substantial percentage of the available space within a window, particularly where the overall window size is reduced as shown. This typically leaves less room for display of information which is of primary interest, i.e, the work object 24. However, it is impractical to reduce the size of the scroll bars to any substantial degree when positioned as shown, due to the increased difficulty that will inevitably arise when a user must align a cursor with the scroll bar control buttons 32 in order to activate them. As the number of windows presented within the operative display area increases, the available space lost to control bars will also increase. The present invention addresses these problems by substantially reducing the amount of operative display area which must be devoted to scroll controls.

Figure 2A:
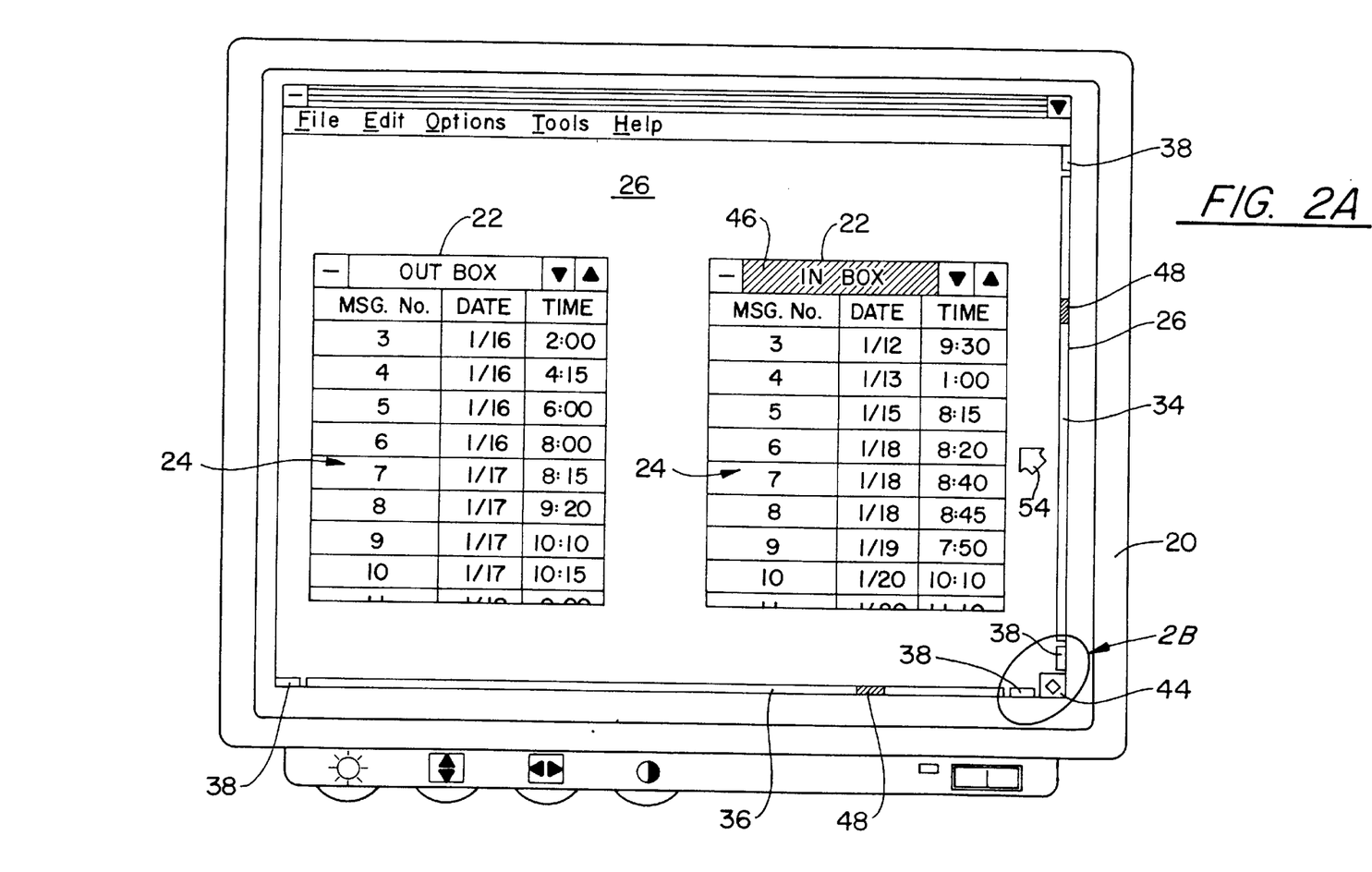
FIGS. 2A is a first embodiment of the scroll control system according to the present invention.
Figure 2B:
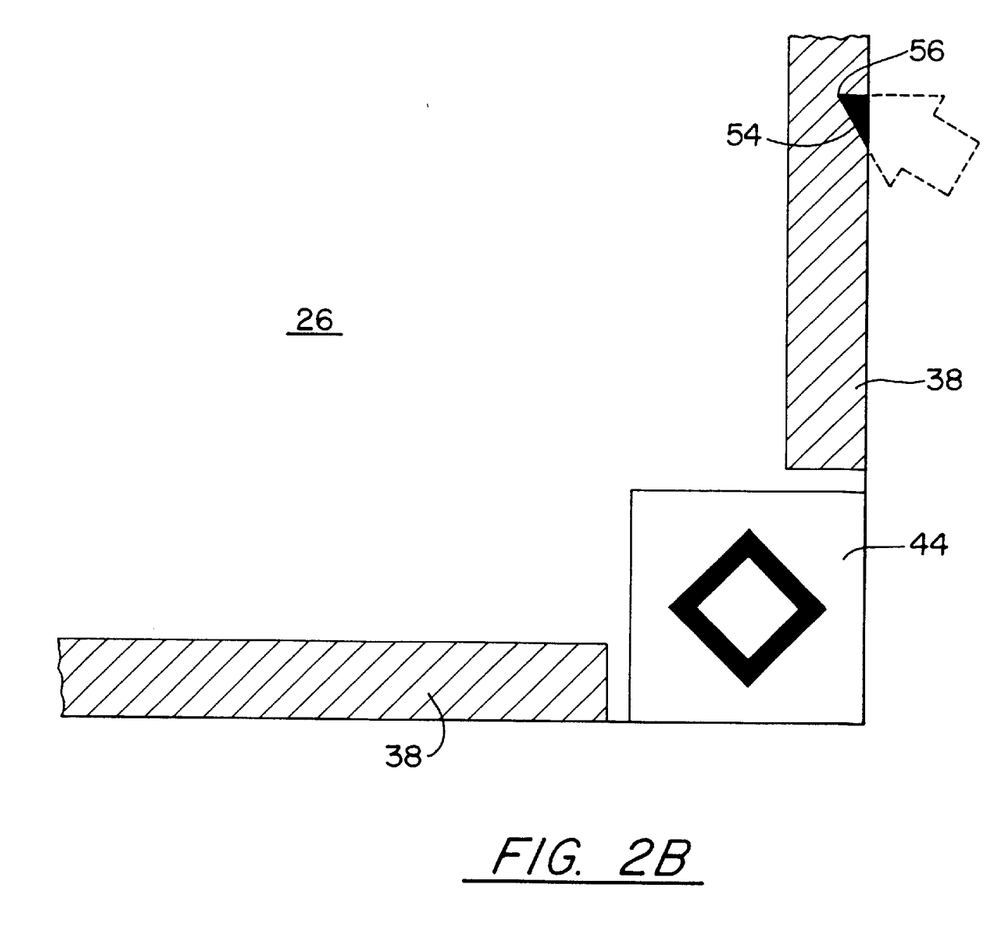
FIG. 2B is an enlarged view of a portion of the scroll control system in FIG. 2A.
Figure 3A:
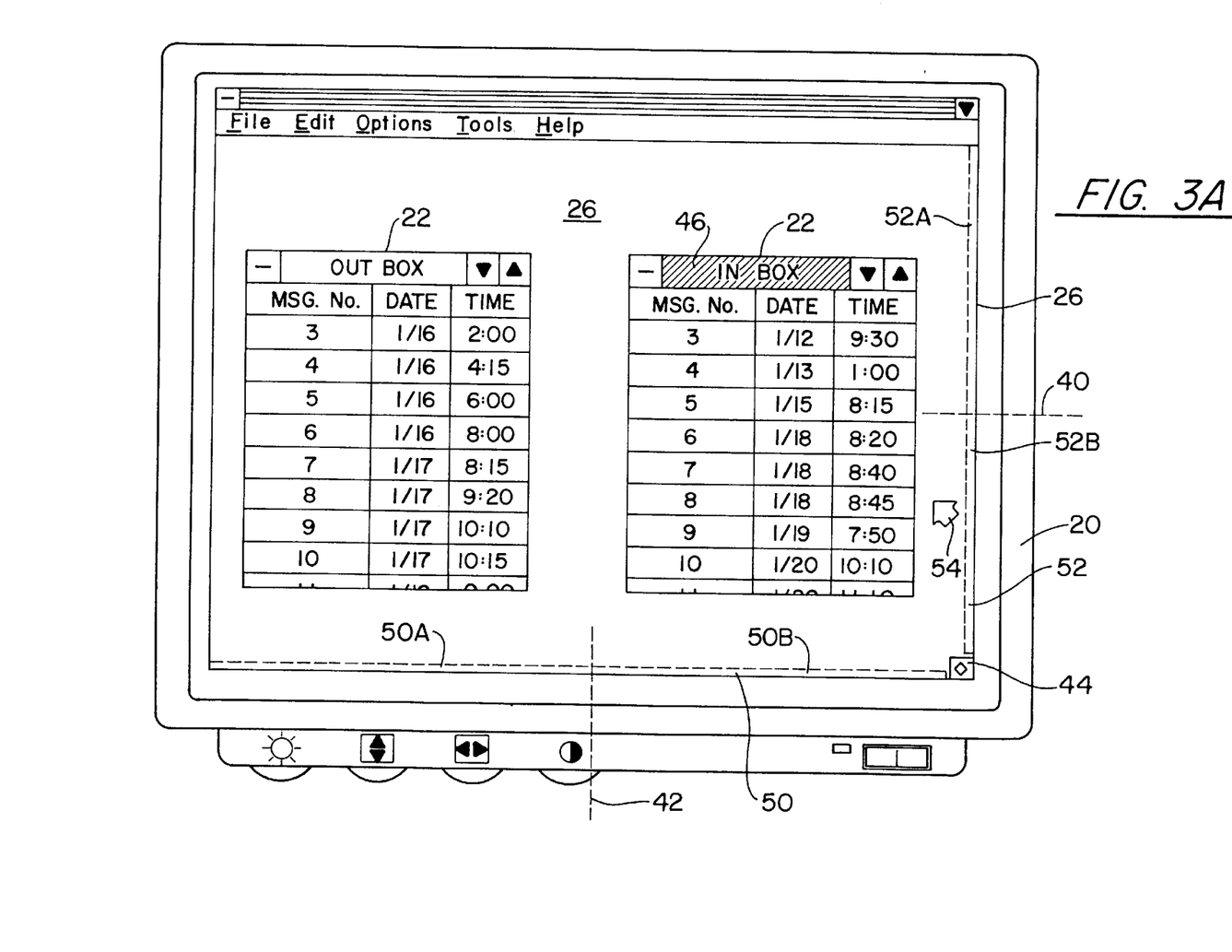
FIG. 3A is a second embodiment of the scroll control system according to the present invention.
Figure 3B:
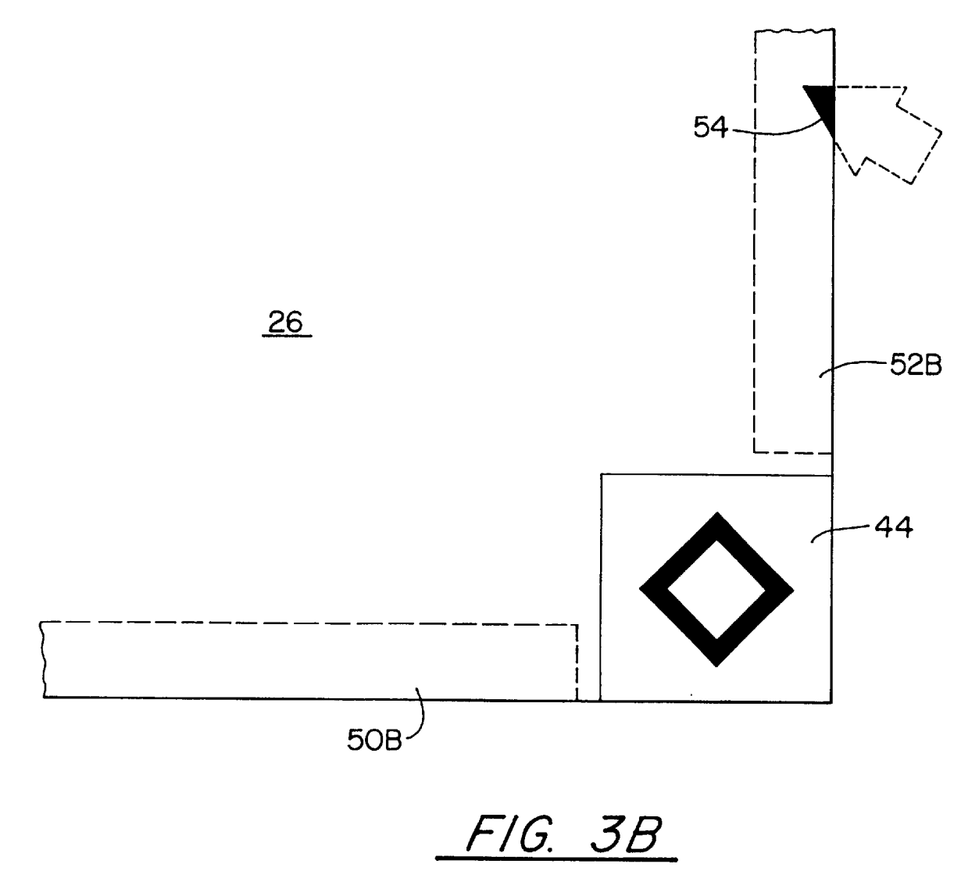
FIG. 3B is an enlarged view of a portion of the scroll control system in FIG. 3A.
Figure 4:
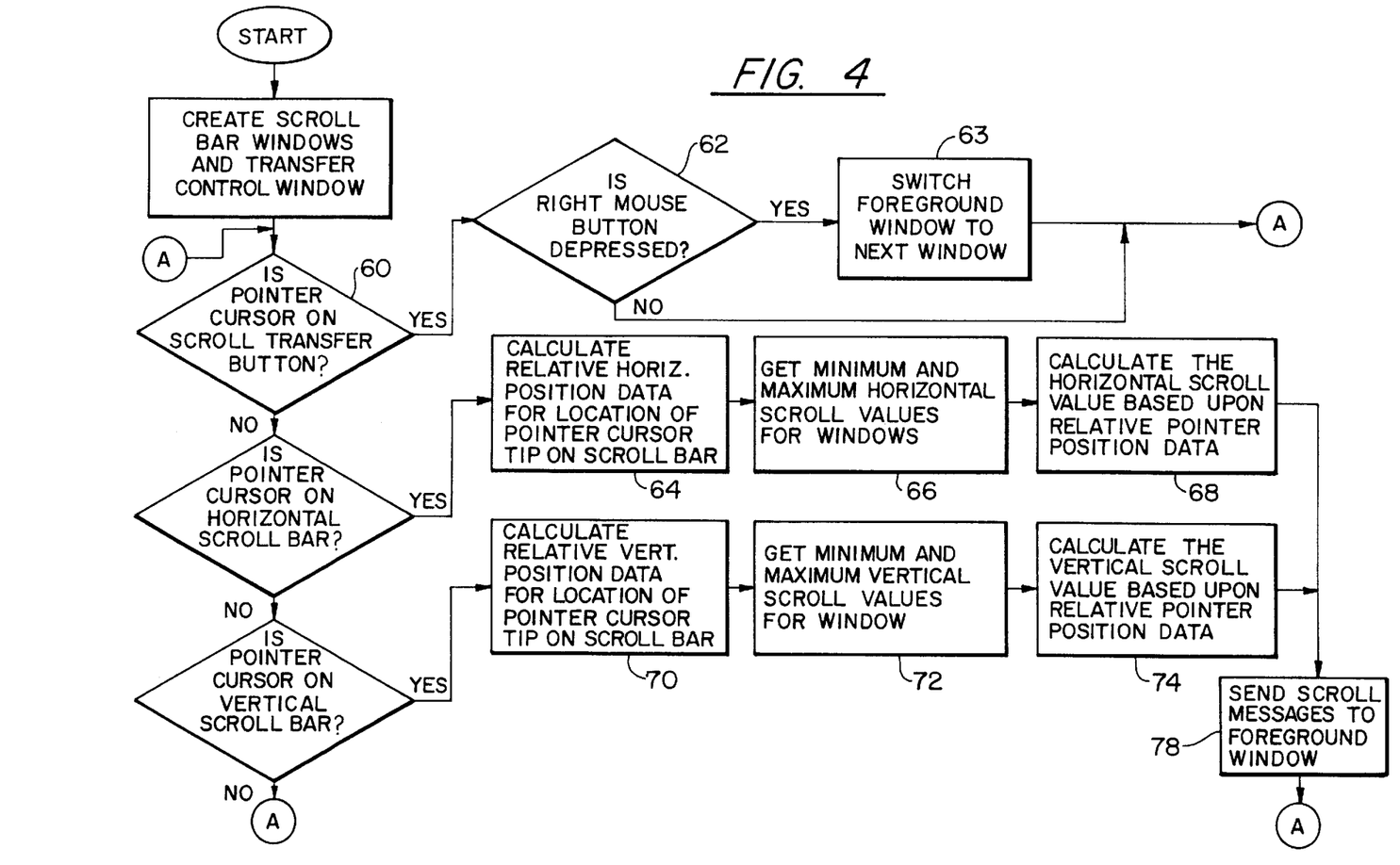
FIG. 4 is a flow chart for controlling the window contained in the display which has the active scroll control.

FIGS. 2–4 illustrate preferred embodiments of the present invention. FIG. 2A shows display unit 20 containing a pair of windows 22 similar to those in FIG. 1. Significantly, however, in the preferred form of the invention illustrated in FIG. 2A, the scroll bars have been eliminated from the windows 22, thereby freeing up additional space therein for display of a larger portion of each work object 24. In place of the multiple sets of scroll bars located within each window, a single set of master vertical and horizontal scroll bars 34, 36 are provided at the periphery of the operative display area 26. The scroll bars 34, 36 in FIG. 2A operate similarly to the scroll bars 28, 30 and are provided with master control buttons 38 for causing a scrolling action in a desired direction. As is apparent in FIG. 2A, however, the thickness of the master scroll bars 36 and 38 is greatly reduced as compared to the individual scroll bar sets in FIG. 1. In fact, the thickness of master scroll bars 36, 38 is preferably reduced to between about 1 to 3 pixels wide, so that it requires use of only a very small portion of the operative display area. If the master scroll bars were placed at any location within the operative display area other than at the edge of the screen, a user would experience substantial difficulty in aligning a cursor or pointer image with the extremely thin control buttons 38. Significantly, however, conventional user interface display systems such as those incorporated in the Windows family of operating systems will typically limit the movement of a cursor associated with a pointing device to the operative display area 26. Thus, if a user physically moves a mouse or some other pointer device in such a way as might otherwise cause such cursor to move beyond the extreme edge of the operative display area, the cursor will nevertheless remain within the operative display area 26. The present invention takes advantage of this important characteristic by placing the control buttons 38 and the scroll bars at the extreme edge of the operative display area. This permits a user to consistently position the cursor for such pointer so that it is superimposed over the dimensionally thin control buttons 38, by simply moving the pointer to a position where the cursor can move no further beyond the edge of the operative display in an area where control buttons 38 are located. The foregoing concept is illustrated in FIG. 2B, which shows an enlarged view of control buttons 38 with a pointer cursor 54 moved to an extreme position toward an edge of the operative display area. A portion of the pointer cursor shown in phantom may appear to have moved beyond the edge of the display 26. However, the tip 56 of the cursor, which designates the true pointer location, will remain on the edge of the screen regardless of any further physical movement of the pointing device to cause it to move completely off screen. Thus, a user is ensured that the tip 56 of the cursor will be superimposed directly over the control buttons 38, despite the very narrow dimensions of such button.

It should be noted that the operative display area as referred to herein generally refers to the portion of a display unit 20 on which the graphical user interface of an operating system is displayed. As noted above, movement of a cursor pointer is typically limited to the operative display area in graphical user interfaces such as those provided by the Windows family of operating systems which are available from Microsoft Corp. For example, in the Windows operating system the operative display area is commonly referred to as the "Desktop". However, in systems where pointer cursor movement is limited to a sub-portion of the graphical user interface, then the operative display area would be limited to that sub-portion and the scroll controls as described herein would be positioned accordingly at the extreme edge of such region.

The length of the control button 38 is preferably at least ¼" (one quarter inch) to ensure that a user can position the pointer cursor in the proper area for activating the control. Significantly, however, the control button can be much larger, extending even from a corner of the operative display area to a centerline 40 in the case of the vertical master scroll control, and a centerline 42 in the case of the horizontal master scroll control. The scroll controls can be configured so that they are activated when a user superimposes a pointer cursor on the control and then signals the computer system by, e.g. striking a key or clicking on a mouse button. In an alternative embodiment however, the scroll bars can be configured so that a pointer cursor need only be superimposed over a control for some pre-determined amount of time in order to activate the scrolling function.

The master scroll controls are preferably configured so that the window which is the object of such controls is the window which has the operating system focus. In this regard, it may be noted that the term "focus" typically refers to the window which has most recently been acted upon by the user in some way and which is currently considered the active window by the operating system. In the case of the Windows family of operating systems, the window with focus typically has a highlighted title bar 46. In FIG. 2A, the window 22 labeled "In Box" has focus and will therefore be acted upon by the scroll controls 38. In the Windows family of operating systems, the relationship of one window to another is maintained by the operating system in the form of a window hierarchy, wherein each window is uniquely identified with some number. According to a preferred embodiment of the invention, a scroll transfer control 44 is provided for switching active scroll control from one window 22 to another in the window hierarchy. This scroll transfer control 44 may be configured so that it is activated by either a pointer activation signal (such as a mouse click) or by simply allowing the cursor to be dwell on such scroll transfer controls for some predetermined amount of time. In any event, activating the scroll transfer control will cause the operating system focus to shift from one window to the next window in the window hierarchy. As with conventional scroll controls associated with individual windows, a position indicator 48 may also be provided to designate the relative viewpoint of the window 22 with respect to the entire work object 24.

An alternative embodiment according to the invention is illustrated in FIG. 3A. In this embodiment, scroll controls 50, 52 are provided at an extreme edge of an operative display area 26. Significantly, however, the scroll controls 50, 52 in this case are transparent, so that all of the operative display area 26 is available for windows 22 and their respective work objects 24. Since the scroll controls are always at the edge of the operative display area, a user will always be able to conveniently position a pointer cursor on the control. In the embodiment of FIG. 3A, each of the scroll controls are divided into two portions (50A, 50B and 52A, 52B) along centerlines 40 and 42. Activating the portion of the control on one side of one of the centerlines 40, 42 will cause a scrolling action in a first direction and activating the same control on an opposite side of the centerline will cause scrolling in an opposite direction. Thus, in FIG. 3A, scroll control 50A will cause the viewpoint of the active window 22 to move to the left (negatively) and scroll control 50B will cause the viewpoint of the active window to scroll to the right (postitively). Similarly, activating scroll control 52(A) will cause the viewpoint of the active window to scroll upwardly (positively) and activating scroll control 52(B) will cause the viewpoint of the active window to scroll downwardly (negatively).

The scroll controls in FIG. 3A are preferably relatively narrow in thickness (1 to 3 pixels) so that they are activated only when a pointer cursor is moved to the extreme edge of the operative display area. In this way, accidental activation of the scroll controls can be avoided. However, it should be understood that the scroll controls can also be thicker and the invention is not limited in this regard. The scroll transfer control is located at the intersection of the scroll bars in FIGS. 2 and 3, a location which is presently not used with scroll bar controls. However, the scroll transfer control can be located at any convenient area on the screen. It should be noted that while the position of the scroll controls has been illustrated with respect to FIGS. 2 and 3 along the bottom and right edges of the operative display area, such scroll bars could also be positioned at the top and left side of the display area.

It will be appreciated that the scroll controls as described herein with respect to FIGS. 2 and 3 may be activated by any of several well known means, and the invention is not intended to be limited in this regard. For example, the scroll controls can be activated by superimposing a pointer cursor over a control and signaling using the pointer control device. For example, if the pointing device is a mouse, the control can be activated by positioning the cursor over the control and then clicking on one of the mouse keys. In an alternative embodiment, the controls can be activated in the manner of a so called "hot spot" button. Such buttons are activated automatically when a cursor associated with a pointer device is moved to the extreme edge of the operative display area and dwells over the location of a control for a predetermined amount of time, e.g. 1 second. Thus, in FIG. 3A, scrolling can be effected by simply moving a pointer device so that its cursor is positioned at the extreme edge of the screen where scroll controls 50 and 52 are located.

In addition to the basic function of the scroll transfer control 44 as described above, such control preferably also controls the various settings associated with the operation of the scroll bars according to the invention. In particular, by placing the cursor on the scroll transfer control 44 and clicking with a mouse button (preferably the right mouse button), the system will provide a list of available options associated with the scroll bars. These include, but are not limited to, an exit command, to exit the application according to the invention and cause only conventional scroll bars to be used, adjust the amount of dwell time which is required before a pointer cursor residing over a scroll bar will cause the work object to scroll, to adjust the thickness or appearance (visible/invisible) of the scroll bars, and any other parameters associated with the appearance and operation of the scroll system as described herein.

The method and apparatus according to the invention are designed for use on any type of computer system which incorporates a graphical user interface. The system is preferably comprises a central processing unit (CPU), including one or more memory devices and associated circuitry. The memory devices typically comprise an electronic random access memory and a bulk data storage medium, such as a magnetic disk drive. The system includes a pointing device operatively connected to said computer system through suitable interface circuitry, and at least one user interface display unit such as a video data terminal (VDT) operatively connected thereto. The CPU can be comprised of any suitable microprocessor or other electronic processing unit, as is well known to those skilled in the art. An example of such a CPU would include the Pentium brand microprocessor available from Intel Corporation or any similar unit such as an 80486 or 80386 type microprocessor.

The various hardware requirements for the computer system as described herein can generally be satisfied by any one of many commercially available high speed personal computers offered by manufacturers such as Compaq, Hewlett Packard, IBM Corp or Apple Computers. In a preferred embodiment as discussed herein, the operating system for the computer is one of the Windows family of operating systems, such as Windows 3.1, Windows NT, or Windows 95. However, the system is not limited in this regard, and the invention may also be used with any other type of computer operating system incorporating a graphical user interface. The system as disclosed herein can be implemented by a programmer, using commercially available development tools for the operating systems described above.

In a presently preferred embodiment, the subject invention can be implemented as a standard Windows application, i.e. a 32 bit, Object Oriented, C++, Windows 95 application developed using the Microsoft Visual C++ compiler and development tools. In that case, the invention would comprise a single main application class derived from "CWinApp" and three instances of a scroll bar class derived from "CWin". Generally speaking the term "class" as commonly understood and as used herein refers to a collection of application methods and data. The class encapsulates the data such that the data is protected against access, but the methods that are provided by the class permit access to certain limited information. In this regard, it should be noted that "CWinApp" is a well known application class provided in the Windows operating system environment. This class has a number of associated methods or API's for providing the basic application support functions. "CWin" is a class which is also generic to the Windows operating system and provides the basic definition of how a window operates in the Windows operating system.

In a presently preferred embodiment, the main application class can "own" the three scroll bar classes and create them when the application is started. The term "own" here refers to an object oriented programming concept wherein one class contains another class. In other words, the three scroll bar classes in this case are essentially attributes of the main application class. The scroll bars are created by the application by calling a create method for each scroll bar, specifying particulars for each window. For example, the calls to create the scroll bars could be as follows:

"vbar.create( VERTICAL, TRUE)"
"hbar.create( HORIZONTAL, TRUE)" and
"xbar.create( CONTROL, TRUE )".

In this case, the call vbar.create would call specific programming to create the vertical scroll control 52, hbar.create would create the horizotal scroll control 50 and bar.create would create the scroll transfer control 44. There are two parameters in each of the create calls listed above. These include e.g. HORIZONTAL, VERTICAL, CONTROL to identify the type of control to be created, and TRUE or FALSE to indicate whether the scroll bar is to be visible. Following is an example of suitable coding which could be used to implement the method or function for creating each of the foregoing elements:

```
int usb::create( ORIENTATION orient, BOOL visible)
{
    BOOL result;
    CRect myRect( 100, 200, 300, 400 );
    CWnd * desktop = GetDesktopWindow( );
    CRect deskRect;
    int xx, yy, width, height;
    CBrush myBrush;
    Cstring WndName;
    desktop-> GetWindowRect( &deskRect );
    width = deskRect.Width( );
    height = deskRect.Height( );
    myBrush.CreateSysColorBrush( HS_DIAGCROSS );
    switch ( orient )
    {
        case CONTROL:
            WndName = "CONTROL";
            xx = width - 30;
            yy = height - 30;
            width -= 20;
            height -= 20;
            break;
        case VERTICAL:
            WndName = "VERTICAL";
            xx = width - 4;
            yy = 4;
            width -= 4;
            height -= 44;
            break;
```

-continued

```
        case HORIZONTAL :
            WndName = "HORIZONTAL";
            xx = 4;
            yy = height - 4;
            width -= 44;
            height -= 4;
            break;
    }
    result = CreateEx( WS_EX_TOOLWINDOW |
    WS_EX_TOPMOST,
                AfxRegisterWndClass( CS_DBLCLKS |
                CS_PARENTDC,
                    0,
                    mVBrush),
                WndName,
                WS_POPUP,
                xx, yy, width, height,
                NULL,
                NULL);
    if (result = = 0)
    {
        MessageBox( "Error creating USB window");
    }
    else
    {
        ShowWindow( visible ? SW_SHOW: SW_HIDE );
    }
    return(0);
}
```

Additional computer code is provided to implement the functionality of the invention as recited herein. This functionality is illustrated in flowchart form in FIG. 4. In FIG. 4, standard Windows message handlers such as WM_MOUSEMOVE and WM_LBUTTONDOWN can be used in steps 60 and 62 for identifying relative movement and activation of a pointing device, such as a mouse. The Windows Operating System will call these methods when associated pointing device activity is effected by the user and detected by the operating system. Additional processing required to implement the various aspects of the subject invention are preferably supported by other standard Windows API's as is well known to those familiar with the Windows family of operating systems available from Microsoft. For example, the GetWindowRect() API can provide the dimensions of a scroll bar window in steps 64 and 70. In order to determine the specific information relating to the scroll operation for a particular window other standard Windows API's can be used. For example, the windows API GetScrollRange() can be used to determine the limits of a scrollable window in steps 66 and 72. This information, when combined with current mouse pointer coordinate data, can be used to determine the amount of scroll desired by the user. The GetForegroundWindow() API is preferably called in steps 66 and 72 for the purpose of identifying the main window which the user is currently trying to control. This window is typically referred to as the foreground window. In response to this call, the operating system will return a window handle to specify the window which is presently determined to be the foreground window. The GetWindow( ) API can be used to locate the appropriate "child" window within the main window to be controlled.

Other standard Windows API's are preferably used to effect the remaining functional requirements of the invention. For clarity, some of these steps are omitted in FIG. 4. The GetStyle() API can be used to determine if a windows has WS_HSCROLL or WS_VSCROLL styles associated with it, indicating that the window normally makes use of scroll bars. This information is useful for determining whether it is appropriate to provide scroll control to a given window. As discussed herein, an important feature of the invention relates to the ability to avoid the need for placing scroll bars in each window, in order to increase the area which can be devoted to a work object. Thus, in newer application programs designed to work in conjunction with the system according to the invention, no scroll bars would be implemented in windows requiring scrolling. However, in existing applications which are designed to provide scroll bars, the scroll bars would normally be present on the display. In such cases ModifyStyle() and ModifyStyleEx() APIs can be used to hide or render invisible the scroll bars of windows which have them.

Finally, actual movement or scrolling of a particular window in step 78 can also be effected using existing Windows APIs. The SendMessage() API can be used to send SB_THUMBTRACK, SB_THUMBPOSITION, and SB_ENDSCROLL messages to the target window causing it to scroll, just as if the mouse pointer was directly manipulating the window's scroll bars directly. The implementation of the scroll transfer control 44 in step 63 can be implemented using the SetForegroundWindow() API, which changes the foreground window. This action effectively switches scroll control from one window to another, depending upon which window is determined to be in the foreground.

What is claimed is:

1. A graphical windows user interface for a computer having an operating system, said interface comprising:
    a visual display having an operative display area with display boundaries;
    means for concurrently presenting at least two windows in said operative display area, each of said at least two windows being smaller in size than said operative display area, each of said at least two windows being positionable spaced from any of said display boundaries and each of said at least two windows having respective work objects displayed therein, each of said at least two windows being smaller than said work object displayed therein;
    scrolling means disposed along at least one of said display boundaries for providing a scroll function to control whichever one of said respective work objects is viewable in an active one of said at least two windows; and,
    scroll transfer means disposed along at least one of said display boundaries for changing the active one of said at least two windows.

2. The interface of claim 1, wherein said scrolling means is activatable by operation of a pointing device when said pointer cursor is superimposed on one of said display boundaries.

3. The interface of claim 1 wherein said scrolling means is configured for changing which portion of said work object is viewable in an active one of said at least two window by moving a viewpoint of said first window in one of an x and y coordinate direction.

4. The interface of claim 3 wherein said scrolling means is configured so that said viewpoint is scrolled in a first one of said x and y coordinate directions by superimposing said pointer cursor at a first one of said display boundaries delimiting said operative display area in the direction of a second one of said coordinate directions.

5. The interface of claim 4 wherein said first coordinate direction is orthogonal to said second coordinate direction.

6. The interface of claim 4 wherein said scrolling means is configured so that said viewpoint is scrolled positively along said first coordinate direction by superimposing said pointer cursor at said display boundary delimiting said operative display area in the direction of said second one of said coordinate directions, on a first side of a display centerline bisecting said operative display area in the first coordinate direction.

7. The interface of claim 4 wherein said scrolling means is configured so that said viewpoint is scrolled negatively along said first coordinate direction by superimposing said pointer cursor at said display boundary delimiting said operative display area in the direction of said second one of said coordinate directions, on a second side of a display centerline bisecting said operative display area in the first coordinate direction.

8. A method for controlling a graphical windows user interface for a computer having an operating system, said method comprising the steps of:

generating an operative display area with display boundaries;

concurrently presenting at least two windows in said operative display area, each of said at least two windows being smaller in size than said operative display area, each of said at least two windows being positionable spaced from any of said display boundaries;

presenting within in each of said at least two windows respective work objects, each of said at least two windows being smaller than the respective work object displayed therein;

providing a scroll control disposed along at least one of said display boundaries for providing a scroll function to control whichever one of said respective work objects is viewable in an active one of said at least two windows; and, providing a scroll transfer means for changing the active one of said at least two windows.

9. The method of claim 8, comprising the step of initiating said scrolling responsive to operation of a pointing device when said pointer cursor is superimposed on one of said display boundaries.

10. The method of claim 8 wherein said step of scrolling said work object is performed by moving a viewpoint of said first window in one of an x and y coordinate direction.

11. The method of claim 10 wherein said viewpoint is scrolled in a first one said x and y coordinate directions by superimposing said pointer cursor at a first one of said display boundaries delimiting said operative display area in the direction of a second one of said coordinate directions.

12. The method of claim 11 wherein said viewpoint is scrolled positively along said first coordinate direction by superimposing said pointer cursor at said display boundary delimiting said operative display area in the direction of said second one of said coordinate directions, on a first side of a display centerline bisecting said operative display area in said first coordinate direction.

13. The method of claim 11 wherein said viewpoint is scrolled negatively along said first coordinate direction by superimposing said pointer cursor at said display boundary delimiting said operative display area in the direction of said second one of said coordinate directions, on a second side of a display centerline bisecting said operative display area in said first coordinate direction.

14. The method of claim 8 further comprising the step of transferring operative scroll control from said first window to a second window in said operative display area by superimposing said pointer cursor over a portion of the user interface located at an intersection between two of said display boundaries.

15. A computer programmed with a routine of instructions stored in a physical medium for manipulating images on an operative display area, said computer comprising:

means for concurrently displaying a plurality of window areas without scroll bars in said operative display area, each of said plurality of windows being smaller in size than said operative display area and being positionable spaced from any of said display boundaries, and means for displaying a plurality of work objects therein, each of said plurality of windows, being smaller than said work object displayed therein;

scroll transfer means for disposed along at least one of said operative display area boundaries for changing the active one of said plurality of windows; and scrolling means disposed along at least one of said display boundaries for providing a scroll function to control whichever one of said plurality of work objects is viewable in an active one of said plurality of windows.

* * * * *